(12) United States Patent
Zhang et al.

(10) Patent No.: US 10,379,852 B2
(45) Date of Patent: Aug. 13, 2019

(54) APPARATUSES FOR INTEGRATING ARITHMETIC WITH LOGIC OPERATIONS

(71) Applicant: VIA Alliance Semiconductor Co., Ltd., Shanghai (CN)

(72) Inventors: Huaisheng Zhang, Shanghai (CN); Dacheng Liang, Shanghai (CN); Boming Chen, Shanghai (CN); Renyu Bian, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 97 days.

(21) Appl. No.: 15/685,332

(22) Filed: Aug. 24, 2017

(65) Prior Publication Data

US 2018/0373536 A1    Dec. 27, 2018

(30) Foreign Application Priority Data

Jun. 27, 2017  (CN) .......................... 2017 1 0499441

(51) Int. Cl.
| | |
|---|---|
| G06F 9/30 | (2018.01) |
| G06F 15/16 | (2006.01) |
| G06F 7/57 | (2006.01) |
| G06F 7/483 | (2006.01) |
| G06F 9/38 | (2018.01) |

(Continued)

(52) U.S. Cl.
CPC .......... *G06F 9/30014* (2013.01); *G06F 7/483* (2013.01); *G06F 7/57* (2013.01); *G06F 9/30021* (2013.01); *G06F 9/30029* (2013.01); *G06F 9/30094* (2013.01); *G06F 9/30185* (2013.01); *G06F 9/30189* (2013.01); *G06F 9/3887* (2013.01); *G06F 9/3893* (2013.01); *G06F 15/16* (2013.01); *G06F 7/026* (2013.01); *G06F 7/49936* (2013.01); *G06F 7/74* (2013.01); *G06F 9/30036* (2013.01); *G06F 9/30134* (2013.01);

(Continued)

(58) Field of Classification Search
CPC ....................................... G06F 15/16
USPC ....................................... 708/205
See application file for complete search history.

(56) References Cited

U.S. PATENT DOCUMENTS 4,402,042 A * 8/1983 Guttag ................ G06F 9/30145
                                                                    712/207
4,403,284 A * 9/1983 Sacarisen ................ G06F 9/268
                                                                    712/208

(Continued)

FOREIGN PATENT DOCUMENTS

| CN | 104011660 A | 8/2014 |
|---|---|---|
| CN | 104145245 A | 11/2014 |

(Continued)

OTHER PUBLICATIONS

Non-Final Office Action dated Oct. 3, 2018, issued in U.S. Appl. No. 15/685,312.

*Primary Examiner* — Tan V Mai
(74) *Attorney, Agent, or Firm* — McClure, Qualey & Rodack, LLP

(57) ABSTRACT

An apparatus for integrating arithmetic with logic operations contains at least a calculation device and a post-logic unit. The calculation device calculates source data to generate and output first destination data. The post-logic unit, coupled to the calculation device, performs a comparison operation for comparing the first destination data with 0 and outputs a comparison result.

11 Claims, 5 Drawing Sheets

(51) Int. Cl.
    *G06F 7/499*   (2006.01)
    *H04N 19/85*   (2014.01)
    *G06F 7/02*    (2006.01)
    *G06F 7/74*    (2006.01)

(52) U.S. Cl.
    CPC ............ *G06F 2207/382* (2013.01); *G06F 2207/3824* (2013.01); *H04N 19/85* (2014.11)

(56) References Cited

U.S. PATENT DOCUMENTS

| | | | |
|---|---|---|---|
| 4,463,421 A * | 7/1984 | Laws | .............. G06F 13/38 710/46 |
| 5,581,496 A | 12/1996 | Lai et al. | |
| 6,704,762 B1 | 3/2004 | Inoue | |
| 9,740,484 B2 | 8/2017 | Gopal et al. | |
| 2009/0265528 A1 | 10/2009 | Du et al. | |
| 2016/0004665 A1 | 1/2016 | Elmer | |
| 2017/0103321 A1 | 4/2017 | Henry et al. | |
| 2017/0185398 A1 | 6/2017 | Anderson et al. | |

FOREIGN PATENT DOCUMENTS

| | | |
|---|---|---|
| CN | 105849690 A | 8/2016 |
| TW | 200604834 A | 1/2006 |
| TW | 200604834 A | 2/2006 |
| TW | 201714081 A | 4/2017 |

* cited by examiner

APPARATUSES FOR INTEGRATING ARITHMETIC WITH LOGIC OPERATIONS

CROSS REFERENCE TO RELATED APPLICATIONS

This application claims the benefit of China Patent Application No. 201710499441.4, filed on Jun. 27, 2017, the entirety of which is incorporated by reference herein.

BACKGROUND

Technical Field

The present invention relates to a GPU (Graphics Processing Unit), and in particular, it relates to apparatuses for integrating arithmetic with logic operations.

Description of the Related Art

The architecture of a GPU (Graphics Processing Unit) typically has hundreds of basic shader processing units, referred to as SPs (Stream Processors). Each SP may deal with one SIMD (Single Instruction Multiple Data) thread of one instruction per cycle, and then switch to another SIMD thread at the next cycle. Typically, in order to conform to the IEEE754 specification, each SP has the capability of calculating FP32 (32-bit floating-point) or INT32 (32-bit integer) values. The 32-bit values may be referred to as FP values. However, in certain applications, such as a pixel shader, image processing, and so on, the SP fulfills the requirements as long as the SP can calculate lower precision values, such as FP16 (16-bit floating-point), FP18 (18-bit floating-point), FP24 (24-bit floating-point) values, or others. FP16, FP18 and FP24 values may be referred to as PP (Partial Precision) values. Thus, methods and apparatuses for calculating FP and PP values are introduced to improve the capacities of one SP.

BRIEF SUMMARY

An embodiment of an apparatus for integrating arithmetic with logic operations contains at least a calculation device and a post-logic unit. The calculation device calculates source data to generate and output first destination data. The post-logic unit, coupled to the calculation device, performs a comparison operation for comparing the first destination data with 0 and outputs a comparison result.

An embodiment of an apparatus for integrating arithmetic with logic operations contains at least a calculation device and a normalization unit. The calculation device calculates source data to generate and output first destination data. The normalization unit, coupled to the calculation device, normalizes the first destination data to generate second destination data of a first type when receiving a signal indicating an output of first-type data, and normalizes the first destination data to generate the second destination data of a second type when receiving the signal indicating an output of second-type data.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
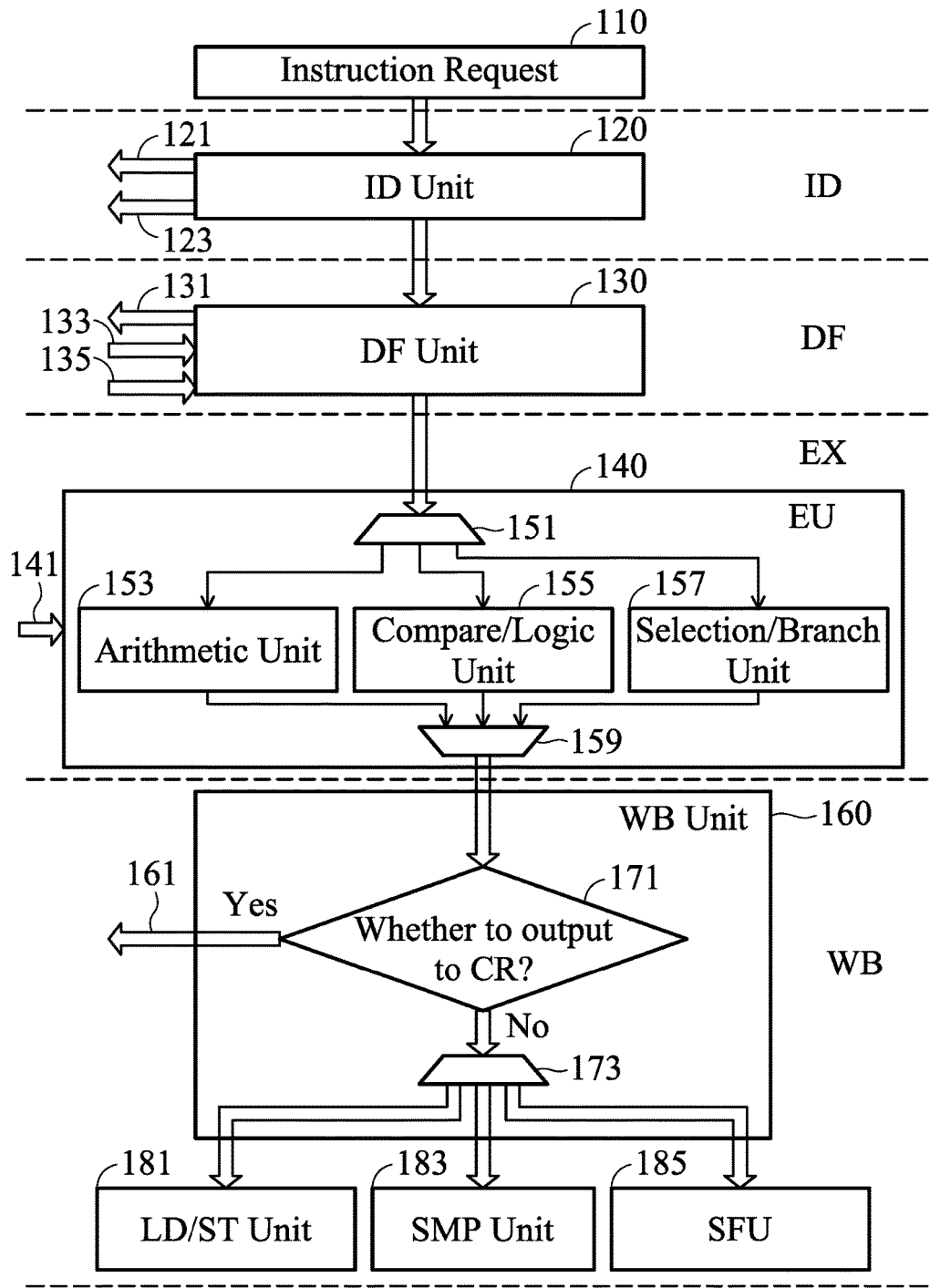
FIG. 1 is a schematic diagram of a pipeline of a general-purpose SP (Stream Processor) according to an embodiment of the invention.

FIG. 1 is a schematic diagram of a pipeline of a general-purpose SP (Stream Processor) according to an embodiment of the invention. A pipeline of an SP may contain four stages in order: the ID (Instruction Decode) stage; the DF (Data Fetch) stage; the EX (Execute) stage; and the WB (Write Back) stage. A final result generated by the WB stage may be stored in a CR (Common Register) or output to a post-processing unit. Specifically, an ID unit 120 decodes an instruction request 110 sent from a compiler, and informs the relevant devices of a CR address 121 and/or a CB address 123 for data or constants to be obtained. The ID unit 120 may obtain Opcode (Operation Code) from the instruction request 110. A DF unit 130 obtains data 133 stored at the CR address 121 and/or constants 135 stored at CB address 123, and if required, inform the relevant devices of the CR address 131, to which data is to be written back. The obtained data 133 and/or constants 135 may be referred to as operands, such as FP and PP values. An EU unit 140 may receive operands from the DF unit 130 and/or data or constants 141 from a CR or a CB (Constant Buffer). The EU unit 140 may control DEMUX (De-multiplexer) 151 to connect the DF unit 130 to one of an arithmetic unit 153, a compare/logic unit 155 and a selection/branch unit 157 for transmitting the Opcode and the operands from the DF unit 130 to the connected unit. In addition, the EU (Execution Unit) 140 may control a MUX (Multiplexer) 159 to connect one of the arithmetic unit 153, the compare/logic unit 155 and the selection/branch unit 157 to a WB unit 160 for transmitting an execution result from the connected unit to the WB unit 160. The arithmetic unit 153 may perform calculation operations according to the Opcode and the operands. The calculation operations may include addition, subtraction, multiplication, division, rounding, and the like. The comparison/logic unit 155 may perform the comparison or logic operation on the operands according to the Opcode. The comparison operations may include maximum, minimum, comparison, and the like. The logic operations may include AND, OR, NOT, NOR, XOR, and the like. The arithmetic unit 153, the compare/logic unit 155 and the selection/branch unit 157 may be referred to as ALUs (Arithmetic Logic Units) collectively. The WB unit 160 may write the calculated data 161 back to the CR or send the calculated data to one of the LD/ST (Load/Store) unit 181, the SMP (Sampling) unit 183 and the SFU (Special Function Unit) 185. Specifically, a comparison unit 171 determines to which of the LD/ST unit 181, the SMP unit 183 and the SFU 185 the calculated results are output according to destination addresses of the operands. In addition, the WB unit 160 may control a DEMUX 173 to output the calculated results to one of the LD/ST unit 181, the SMP unit 183 and the SFU 185 according to the destination addresses of the operands. The SFU 185 implements complicated mathematics operations, such as SIN, COS, SQRT, etc. The LD/ST unit 181, the SMP unit 183 and the SFU unit 185 may be referred to as post-processing units collectively.

Figure 2:
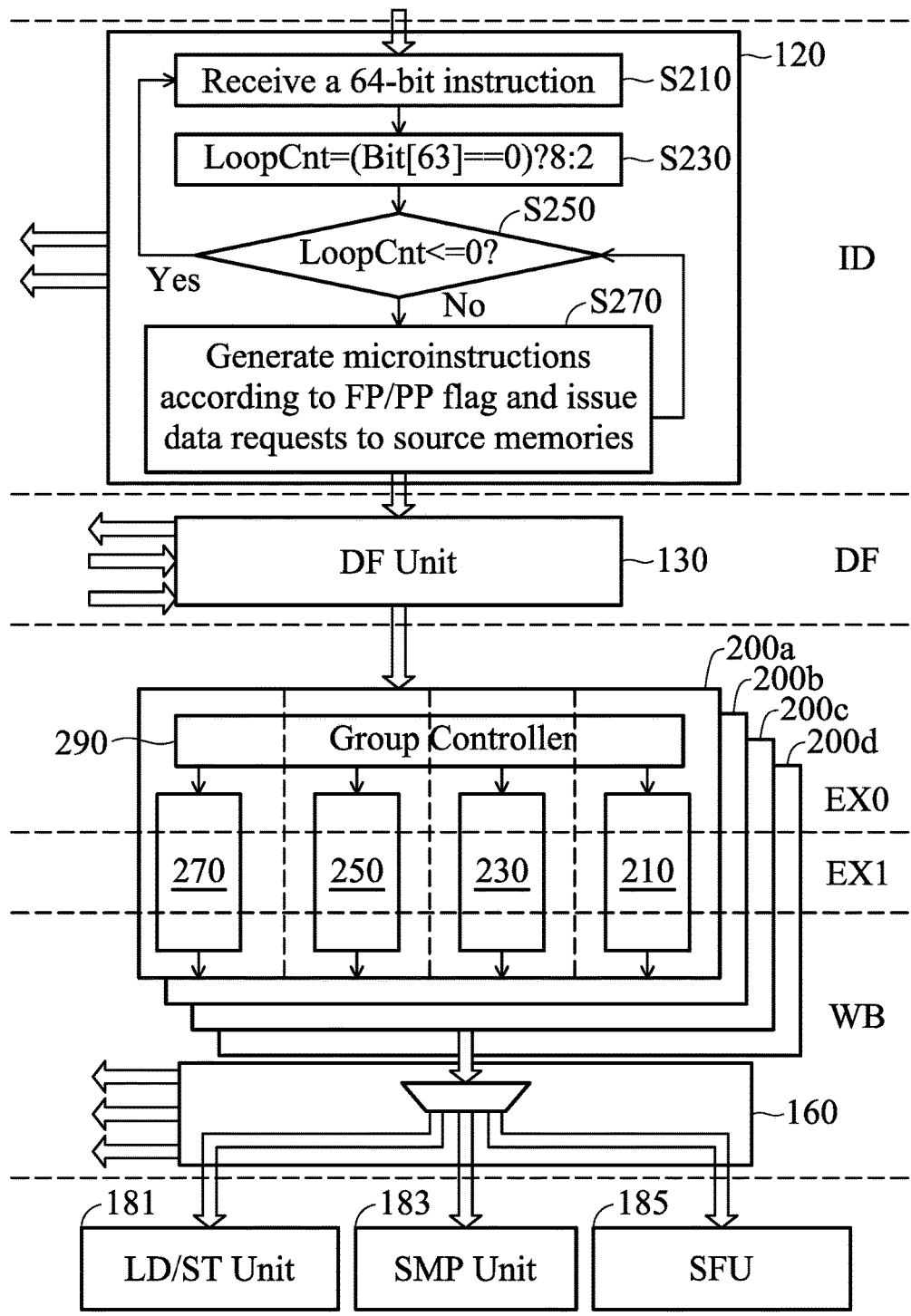
FIG. 2 is a schematic diagram of a pipeline of an SP according to an embodiment of the invention.

One thread contains 32 lanes (denoted as SIMD32) that can be executed together. FIG. 2 is a schematic diagram of a pipeline of an SP according to an embodiment of the invention. One SP may contain multiple ALGs (Arithmetic Logic Groups), such as the ALGs 200a to 200d. Each ALG (also referred to as ALU-Quad) may contain a group controller 290 and four computation units 210, 230, 250 and 270 for performing calculations on four sets of PP data in parallel or one set of FP value at one cycle. Therefore, each SP may support calculations on four sets of FP data or 16 sets of PP data. Any of the computation units 210, 230, 250 and 270 may perform calculations on 24-bit values (also referred to as PP values). The computation units 210, 230, 250 and 270 together may perform calculations on 32-bit values (also referred to as FP values).

Figure 3A:
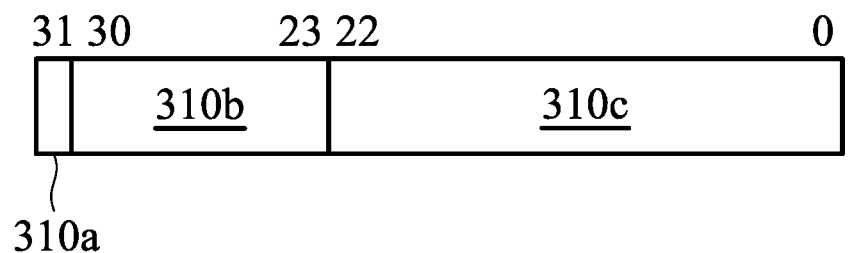
FIG. 3A is a schematic diagram illustrating an FP (Full Precision) floating-point value according to an embodiment of the invention.
Figure 3B:
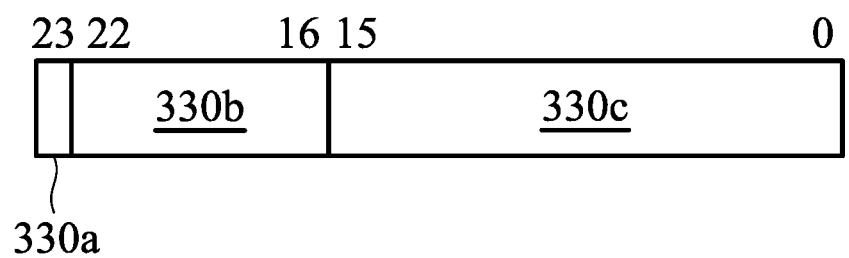
FIG. 3B is a schematic diagram illustrating a PP (Partial Precision) floating-point value according to an embodiment of the invention.

FIG. 3A is a schematic diagram illustrating an FP floating-point value according to an embodiment of the invention. The FP floating-point value is represented in 32 bits. The MSB (Most Significant Bit, the $31^{th}$ bit) of the FP floating-point value is a sign bit 310a. The FP floating-point value additionally contains a mantissa of 23 bits (the $0^{th}$ to $22^{th}$ bits) 310c and an exponent of 8 bits (the $23^{th}$ to $30^{th}$ bits) 310b. FIG. 3B is a schematic diagram illustrating a PP floating-point value according to an embodiment of the invention. The PP floating-point value is represented in 24 bits. The MSB (the $23^{th}$ bit) of the PP floating-point value is a sign bit 330a. The PP floating-point value additionally contains a mantissa of 16 bits (the $0^{th}$ to $15^{th}$ bits) 330c and an exponent of 7 bits (the $16^{th}$ to $22^{th}$ bits) 330b.

Each of the computation units 210, 230, 250 and 270 may complete a FMAD operation for PP values independently, or the computation units 210 in coordination with the computation units 230, 250 and 270 may complete a FMAD operation for FP values. An exemplary equation of the FMAD operation (=a×b+c) is shown as follows:

$$dest = Src0 \times Src1 + Src2,$$

Src0, Src1 and Src2 represent PP/FP values of three source memories, and dest represents a PP/FP value to be stored in a destination memory or output to a post-processing unit. Each of the computation units 210, 230, 250 and 270 contains at least one multiplier for multiplying the PP/FP value Src0 by the PP/FP value Src1. Each of the computation units 210, 230, 250 and 270 additionally contains an adder for adding the output of the multiplier to the PP/FP value Src2 to generate a calculation result of the FMAD operation.

A pipeline of an SP may contain five stages in order: the ID stage; the DF stage; the EX0 (the $0^{th}$ Execute) stage; the EX1 (the $1^{st}$ Execute) stage; and the WB stage. An ID unit 120 may perform a decoding process to detect an instruction mode, such as an FP or PP mode, and generate m microinstructions for calculating data of a first type or n microinstructions for calculating data of a second type. In some embodiments, m is 2, n is 8, the data of the first type is PP data and the data of the second type is FP data. Specifically, the ID unit 120 may receive a 64-bit instruction from a compiler, which contains an Opcode, source, destination and predicate operands and an FP/PP flag, or others (step S210). The MSB (bit63) of the instruction stores the FP/PP flag. For example, if the FP/PP flag is 0, then the instruction is an FP instruction. If the FP/PP flag is 1, then the instruction is a PP instruction. It should be noted that the indications of the FP/PP flag may be swapped and the invention should not be limited thereto. If the FP/PP flag is 1, then a loop count LoopCnt is set to 2. If the FP/PP flag is 0, then the loop count LoopCnt is set to 8 (step S230). When the loop count LoopCnt is less than or equals 0 (the "Yes" path of step S250), the next 64-bit instruction is received from the compiler (step S210). When the loop count LoopCnt is greater than 0 (the "No" path of step S250), microinstructions are generated according to the FP/PP flag, addresses of source memories are generated, data requests are issued to the source memories according to the generated addresses, and the loop count LoopCnt is updated (step S270). The source memory may be a CR (Common Register) or a CB (Constant Buffer). For example, when the FP/PP flag is 1, SIMD16 instructions are generated, the source memory addresses at which stores the PP values Src0 and Src1 of 16 lanes are generated, data requests are issued to the source memories according to the generated addresses, and the loop count LoopCnt is decreased by 1. When the FP/PP flag is 0, SIMD4 instructions are generated, the source memory addresses at which stores the FP values Src0 and Src1 of 4 lanes are generated, data requests are issued to the source memories according to the generated addresses, and the loop count LoopCnt is decreased by 1. In the PP mode, through the aforementioned decoding process, the EX stage can execute the $0^{th}$ lane (lane$_0$) to the $15^{th}$ lane (lane$_{15}$) of the thread at the $1^{st}$ cycle and execute the $16^{th}$ lane (lane$_{16}$) to the $31^{th}$ lane (lane$_{31}$) of the thread at the $2^{nd}$ cycle. In the FP mode, through the aforementioned decoding process, the EX stage can execute the $0^{th}$ lane (lane$_0$) to the $3^{rd}$ lane (lane$_3$) of the thread at the $1^{st}$ cycle and execute the $4^{th}$ lane (lane$_4$) to the $7^{th}$ lane (lane$_7$) of the thread at the $2^{nd}$ cycle, and so on.

A DF unit 130 fetches the source data Src0 and Src1 from the source memories. The DF unit 130 may further receive predicate data from a predicate memory and generate a lane mask. The predicate memory may be a PR (Predicate Register).

In the EX0 stage, a group controller 290 of each of the ALGs 200a to 200d may instruct the computation units 210,

230, 250 and 270 to operate in the PP mode or the FP mode according to a microinstruction type. When the microinstruction is a SIMD16 instruction, the computation units 210, 230, 250 and 270 are instructed to operate in the PP mode. When the microinstruction is a SIMD4 instruction, the computation units 210, 230, 250 and 270 are instructed to operate in the FP mode. The ALGs 200*a* to 200*d* may execute multiplications of the source data Src0 by the source data Src1 of SIMD4 FP lanes or SIMD16 PP lanes in parallel.

In the PP mode of the EX1 stage, the ALGs 200*a* to 200*d* may execute additions of the source data Src2 to the multiplication results, and then, output the summation results in parallel. In the FP mode of the EX1 stage, the computation unit 210 of each of the ALGs 200*a* to 200*d* may combine multiplication results of the computation units 210, 230, 250 and 270, execute additions of the source data Src2 to the combined multiplication results, and then, output the summation results in parallel.

In the PP mode of the WB stage, each of the computation units 210, 230, 250 and 270 of the ALGs 200*a* to 200*d* performs a normalization and a data formatting for generating PP data to be stored in a destination memory or output to a post-processing unit. In the FP mode of the WB stage, each computation unit 210 of the ALGs 200*a* to 200*d* performs a normalization and a data formatting for generating FP data to be stored in a destination memory or output to a post-processing unit. The destination memory may be a CR.

In addition, each of the computation units 210, 230, 250 and 270 may use the aforementioned architecture to complete other basic calculations on the PP values, such as a multiplication, an addition, and so on. Or, each computation unit 210 in coordination with the corresponding computation units 230, 250 and 270 may use the aforementioned architecture to complete other basic calculations on the FP values.

For example, a FMUL operation (=axb) is equivalent to:

$$\text{dest}=Src0 \times Src1+0.$$

In the ID stage, the ID unit 120 may store the source data Src2=0 in the designated source memory. Finally, the calculation result of the FMUL operation is output.

For example, a FADD operation (=a+b) is equivalent to:

$$\text{dest}=Src0 \times 1.0+Src2.$$

In the ID stage, the ID unit 120 may store the source data Src1=1.0 in the designated source memory. Finally, the calculation result of the FADD operation is output.

For example, a FCMP_GT operation (=a>b) is equivalent to:

$$\text{dest}=Src0 \times 1.0+(-Src2).$$

In the ID stage, the ID unit 120 may convert the source data Src2 into −Src2 and store the converted result in the designated source memory. Finally, 1 is output when the sign bit of the calculation result of the FCMP_GT operation is 0 and the mantissa and the exponent of the calculation result of the FCMP_GT operation are not 0. Otherwise, 0 is output.

For example, a MIN operation (=min(a,b)) is equivalent to:

$$\text{dest}=Src0 \times 1.0+(-Src2).$$

In the ID stage, the ID unit 120 may convert the source data Src2 into −Src2 (the negative of the source data Src2) and store the converted result in the designated source memory.

Finally, the source data Src0 or Src2 is output according to a sign bit of the calculation result of the MIN operation.

Figure 4:
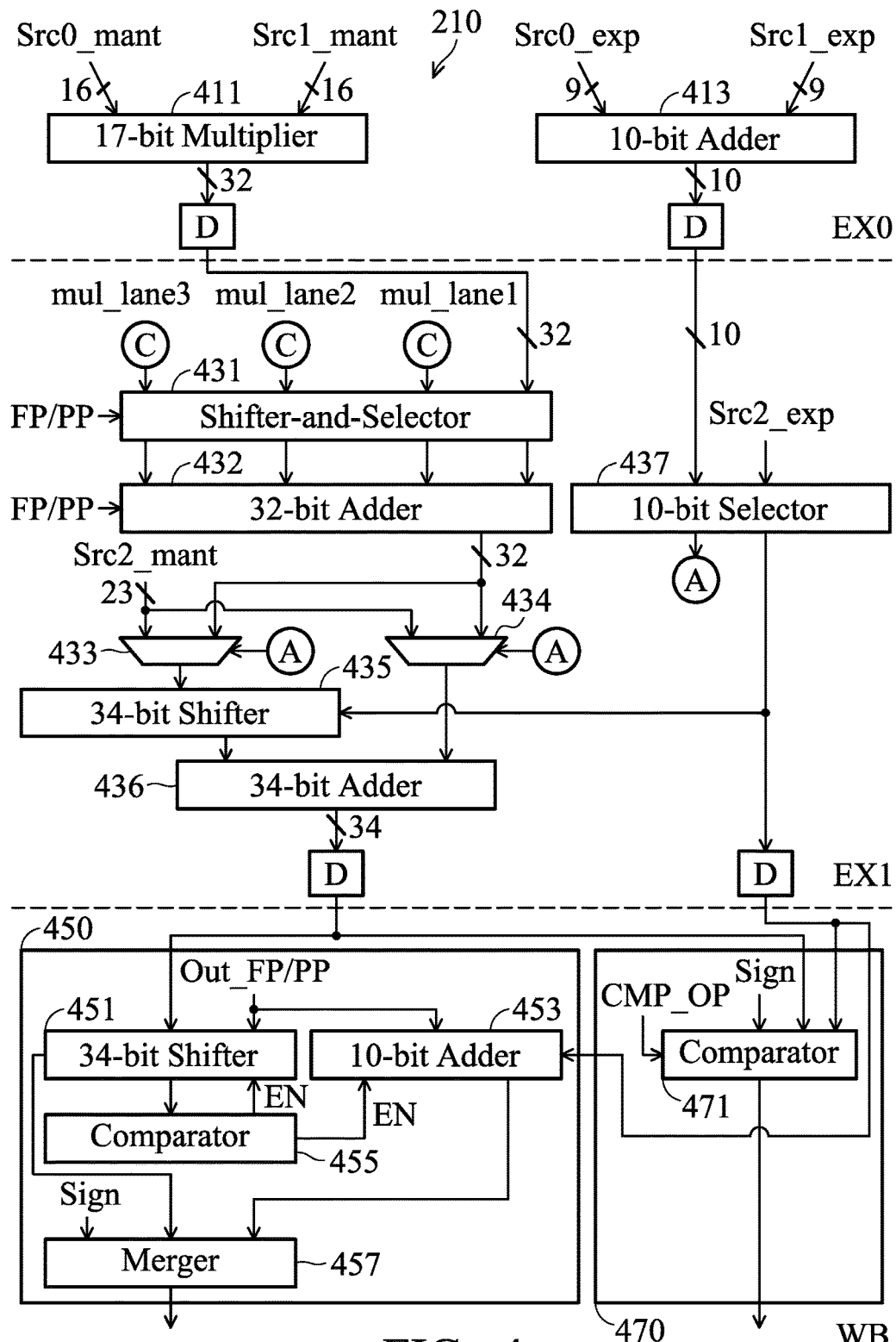
FIG. 4 is the hardware architecture of a first-type computation lane of an ALG (Arithmetic Logic Group) according to an embodiment of the invention.

FIG. 4 is the hardware architecture of a first-type computation lane of an ALG according to an embodiment of the invention. The first-type computation lane may be implemented in the computation unit 210 containing hardware of EX0, EX1 and WB stages, where the hardware of each stage is coupled to the hardware of the prior stage via delay circuits (denoted as "D"). The computation unit 210 may operate in the PP or FP mode according to the instruction of the group controller 290. The hardware of the EX0 stage contains a 17-bit multiplier 411 and a 10-bit adder 413 and the hardware of the EX1 stage contains a shifter-and-selector 431, a 32-bit adder 432, multiplexers 433 and 434, a 34-bit shifter 435, a 34-bit adder 436 and 10-bit selector 437.

The following describes a process operated in the PP mode when the computation unit 210 receives an instruction of the PP mode from the group controller 290: In the EX0 stage, for completing a calculation of Src0×Src1, the 17-bit multiplier 411 multiplies a mantissa of a PP value Src0 (denoted as Src0_mant) by a mantissa of a PP value Src1 (denoted as Src1_mant) to generate a result of 34 bits and the 10-bit adder 413 adds an exponent of the PP value Src0 (denoted as Src0_exp) to an exponent of the PP value Src1 (denoted as Src1_exp) to generate a result of 10 bits. In the EX1 stage, for completing a calculation of (Src0×Src1)+Src2, the 10-bit selector 437 compares an exponent of a PP value Src2 (denoted as Src2_exp) with the output result from the 10-bit adder 413 and outputs the greater as a final result of an exponent of (Src0×Src1)+Src2. It should be noted that, in the PP mode, since the result generated by the computation unit 210 is not required to combine with results generated by the computation units 230, 250 and 270, the shifter-and-selector 431 and the 32-bit adder 432 transmit the output of the 17-bit multiplier 411 downward. In addition, the 10-bit selector 437 further controls the multiplexers 433 and 434 to transmit one of the output of the 17-bit multiplier 411 and a mantissa of the PP value Src2 (denoted as Src2_mant) to the 34-bit shifter 435, and transmit the other to the 34-bit adder 436. The 34-bit adder 436 adds an output of the 34-bit shifter 435 to an output of the multiplexer 434 to generate a final result of a mantissa of (Src0×Src1)+Src2.

Hardware of the WB stage contains a normalization unit 450. To enable the computation unit 210 to output a result of a PP value, the ID unit 120 transmits a signal Out_PP to the 34-bit shifter 451 to direct the 34-bit shifter 451 to drop 7 bits from the output (i.e. the mantissa) of the 34-bit adder 436 to generate a 27-bit mantissa and transmits the signal Out_PP to the 10-bit adder 453 to direct the 10-bit adder 453 to drop 1 bit from the output (i.e. the exponent) of the 10-bit selector 437 to generate a 9-bit exponent. A comparator 455, the 34-bit shifter 451 and the 10-bit adder 453 form a loop for a normalization. The comparator 455 repeatedly operates until the MSB of the output of the 34-bit shifter 451 is 1. In each iteration, when the MSB of the output of the 34-bit shifter 451 is not 1, the comparator 455 outputs an enabling signal EN to the 34-bit shifter 451 and the 10-bit adder 453, enabling the 34-bit shifter 451 to left-shift the result of 27 bits by one bit and the 10-bit adder 453 to add −1 to the result of 9 bits. The adjustment by the 34-bit shifter 451 and the 10-bit adder 453 continues until the comparator 455 detects that the MSB of the output of the 34-bit shifter 451 is 1. A merger 457 merges the sign bit of one bit, the mantissa of 16 bits (the final output of the 34-bit shifter 451) and the exponent of 7 bits (the final output of the 10-bit adder 453) and outputs a merged result (as shown in FIG.

3B). The merged result may be stored in a destination memory or output to a post-processing unit.

Since the result of the FMAD operation or the aforementioned basic operation is usually compared with 0, the compiler may append a post-logic instruction to the FMAD operation or the aforementioned basic operation, such as:

ALU-instr Dest,Src1,Src0+Pxxx DstPrf,Dest.cmp0,[!]SrcP0

ALU-instr represents the FMAD operation or the aforementioned basic operation, Src0 and Src1 represent source data, Dest represents destination data, Dest.cmp0 represents a comparison result between the destination data and 0 and [!]SrcP0 represents data of a source PR as a source operand of the post-logic instruction. The symbol "cmp0" represents a designated comparison. The symbol "xxx" represents a designated logic operation as listed below:

| PCMP_OP (3 bit) | cmp0 | expression | Description |
|---|---|---|---|
| 0 | NVR | Return 0 | Always output 0 |
| 1 | GT0 | Dest > 0 | If destination data is greater than 0 |
| 2 | EQ0 | Dest == 0 | If destination data equals 0 |
| 3 | GE0 | Dest >= 0 | If destination data equals or is greater than 0 |
| 4 | LT0 | Dest < 0 | If destination data is less than 0 |
| 5 | NE0 | Dest! = 0 | If destination data does not equal 0 |
| 6 | LE0 | Dest <= 0 | If destination data is less than or equals 0 |
| 7 | ALS | Return 1 | Always output 1 |

To improve performance, the computation unit 210 may be equipped with a post-logic unit 470 in the WB stage and the post-logic unit 470 contains a comparator 471. When interpreting a post-logic instruction, the ID unit 120 outputs a comparison Opcode PCMP_OP of 3 bits to the comparator 471 to direct the comparator 471 to perform a comparison of the destination data with 0 according to PCMP_OP and output a comparison result. It should be noted that the destination data may be a floating-point value and not undergone a normalization.

When PCMP_OP is 0, the comparator 471 may output 0 directly.

When PCMP_OP is 1, the comparator 471 detects the sign bit of the calculation result and the outputs of the 34-bit adder 436 and the 10-bit selector 437 for the calculation result. The comparator 471 outputs 1 when the sign bit is 0 and the outputs of the 34-bit adder 436 and the 10-bit selector 437 are not 0s. Otherwise, the comparator 471 outputs 0.

When PCMP_OP is 2, the comparator 471 detects the sign bit of the calculation result and the outputs of the 34-bit adder 436 and the 10-bit selector 437 for the calculation result. The comparator 471 outputs 1 when the sign bit and the outputs of the 34-bit adder 436 and the 10-bit selector 437 are all 0s. Otherwise, the comparator 471 outputs 0.

When PCMP_OP is 3, the comparator 471 may detect the sign bit of the calculation result only. The comparator 471 outputs 1 when the sign bit is 0. Otherwise, the comparator 471 outputs 0.

When PCMP_OP is 4, the comparator 471 may detect the sign bit of the calculation result only. The comparator 471 outputs 1 when the sign bit is 1. Otherwise, the comparator 471 outputs 0.

When PCMP_OP is 5, the comparator 471 detects the sign bit of the calculation result and the outputs of the 34-bit adder 436 and the 10-bit selector 437 for the calculation result. The comparator 471 outputs 1 when at least one of the sign bit and the outputs of the 34-bit adder 436 and the 10-bit selector 437 is 1. Otherwise, the comparator 471 outputs 0.

When PCMP_OP is 6, the comparator 471 detects the sign bit of the calculation result and the outputs of the 34-bit adder 436 and the 10-bit selector 437 for the calculation result. The comparator 471 outputs 1 when the sign bit and the outputs of the 34-bit adder 436 and the 10-bit selector 437 are all 0s, or the sign bit is 1. Otherwise, the comparator 471 outputs 0.

When PCMP_OP is 7, the comparator 471 may output 1 directly.

With the post-logic unit 470, the computation unit 210 can output the calculation result of the FMAD operation or the aforementioned basic calculation and the aforementioned logic comparison for the calculation result simultaneously.

Figure 5:
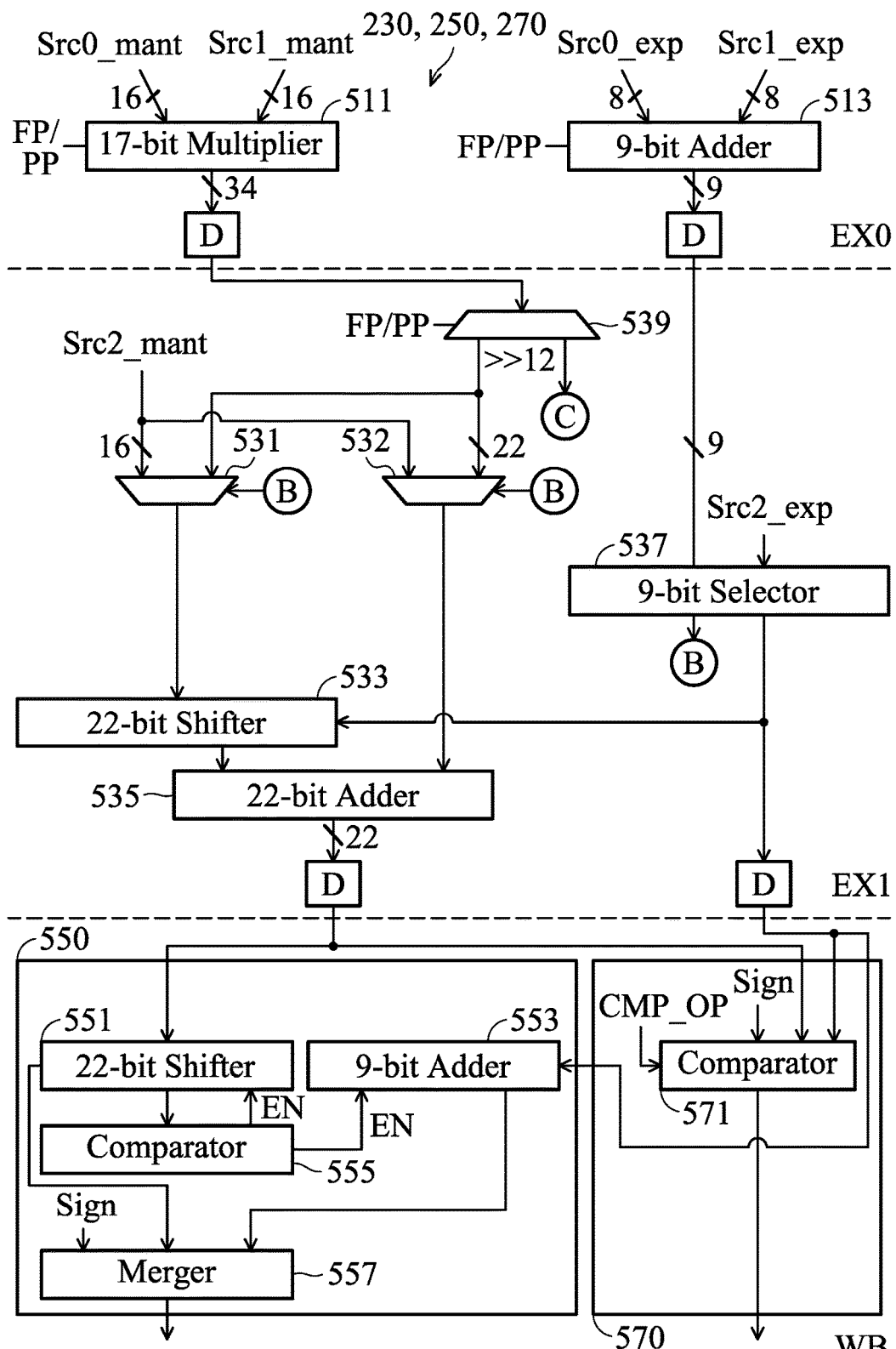
FIG. 5 is the hardware architecture of a second-type computation lane of an ALG according to an embodiment of the invention.

FIG. 5 is the hardware architecture of a second-type computation lane of an ALG according to an embodiment of the invention. The second-type computation lane may be implemented in each of the computation units 230, 250 and 270 containing hardware of EX0, EX1 and WB stages, where the hardware of each stage is coupled to the hardware of the prior stage via delay circuits (denoted as "D"). Each of the computation units 230, 250 and 270 may operate in the PP or FP mode according to the instruction of the group controller 290. The hardware of the EX0 stage contains a 17-bit multiplier 511 and a 9-bit adder 513 and the hardware of the EX1 stage contains multiplexers 531 and 532, a 22-bit shifter 533, a 22-bit adder 535 and 9-bit comparator 537.

The following describes a process operated in the PP mode when each of the computation units 230, 250 and 270 receives an instruction of the PP mode from the group controller 290: In the EX0 stage, for completing a calculation of Src0×Src1, the 17-bit multiplier 511 multiplies a mantissa of a PP value Src0 (denoted as Src0_mant) by a mantissa of a PP value Src1 (denoted as Src1_mant) to generate a result of 34 bits and the 9-bit adder 513 adds an exponent of the PP value Src0 (denoted as Src0_exp) to an exponent of the PP value Src1 (denoted as Src1_exp) to generate a result of 9 bits. It should be noted that the 9-bit adder 513 is operated in the PP mode. That is, the 9-bit adder 513 is not operated when receiving an instruction of the FP mode from the group controller 290. In the EX1 stage, the demultiplexer 539 connects the 17-bit multiplier 511 to the multiplexers 531 and 532. For completing a calculation of (Src0×Src1)+Src2, the 9-bit comparator 537 compares an exponent of a PP value Src2 (denoted as Src2_exp) with the output result from the 9-bit adder 513 and outputs the greater as a final result of an exponent. The 9-bit comparator 537 further controls the multiplexers 531 and 532 according to the comparison result for transmitting one of the output of the 17-bit multiplier 511 and a mantissa of the PP value Src2 (denoted as Src2_mant) to the 22-bit shifter 533, and transmitting the other to the 22-bit adder 535. The 22-bit adder 535 adds an output of the 22-bit shifter 533 to an output of the multiplexer 532 to generate a final result of a mantissa.

Hardware of the WB stage contains a normalization unit 550. A comparator 555, a 22-bit shifter 551 and a 9-bit adder 553 form a loop for a normalization. The comparator 555 repeatedly operates until the MSB of the output of the 22-bit shifter 551 is 1. In each iteration, when the MSB of the output of the 22-bit shifter 551 is not 1, the comparator 555 outputs an enabling signal EN to the 22-bit shifter 551 and the 9-bit adder 553, enabling the 22-bit shifter 551 to left-shift the result of 22 bits by one bit and the 9-bit adder 553 to add −1 to the result of 9 bits. The adjustment by the 22-bit shifter 551 and the 9-bit adder 553 continues until the comparator 555 detects that the MSB of the output of the 22-bit shifter 551 is 1. A merger 557 merges the sign bit of one bit, the mantissa of 16 bits (the final output of the 22-bit shifter 551) and the exponent of 7 bits (the final output of the 9-bit adder 553) and outputs a merged result (as shown in FIG. 3B). The merged result may be stored in a destination memory or output to a post-processing unit.

To improve efficiency, each of the computation units 230, 250 and 270 may be equipped with a post-processing unit 570 in the WB stage and the post-processing unit 570 contains a comparator 571. Details of the comparator 571 may refer to the descriptions of the comparator 471 and are omitted for brevity.

In addition, the computation unit 210 in coordination with the computation units 230, 250 and 270 may complete a FMAD operation for FP values. In the FP mode, the computation units 230, 250 and 270 calculates portions of a mantissa of Src0×Src1, and the computation unit 210 combines the results by the computation units 230, 250 and 270, continues the following calculation of Src0×Src1+Src2 and complete a FMAD operation for an FP value.

The following describes a process operated in the FP mode when the computation unit 230 receives an instruction of the FP mode from the group controller 290: In the EX0 stage, for completing the corresponding portion of a mantissa calculation of Src0×Src1, the 17-bit multiplier 511 of the computation unit 230 multiplies the 8 highest bits of a mantissa of an FP value Src0 (denoted as Src0_h8) by the 16 lowest bits of a mantissa of an FP value Src1 (denoted as Src1_l16). In the EX1 stage, a demultiplexer 539 of the computation unit 230 connects the 17-bit multiplier 511 of the computation unit 230 to the shifter-and-selector 431 of the computation unit 210 to output the result by the 17-bit multiplier 511 of the computation unit 230 to the shifter-and-selector 431.

The following describes a process operated in the FP mode when the computation unit 250 receives the instruction of the FP mode from the group controller 290: In the EX0 stage, for completing the corresponding portion of a mantissa calculation of Src0×Src1, the 17-bit multiplier 511 of the computation unit 250 multiplies the 16 lowest bits of the mantissa of the FP value Src0 (denoted as Src0_l16) by the 8 highest bits of the mantissa of the FP value Src1 (denoted as Src1_h8). In the EX1 stage, a demultiplexer 539 of the computation unit 250 connects the 17-bit multiplier 511 of the computation unit 250 to the shifter-and-selector 431 of the computation unit 210 to output the result by the 17-bit multiplier 511 of the computation unit 250 to the shifter-and-selector 431.

The following describes a process operated in the FP mode when the computation unit 270 receives the instruction of the FP mode from the group controller 290: In the EX0 stage, for completing the corresponding portion of a mantissa calculation of Src0×Src1, the 17-bit multiplier 511 of the computation unit 270 multiplies the 8 highest bits of the mantissa of the FP value Src0 (denoted as Src0_h8) by the 8 highest bits of the mantissa of the FP value Src1 (denoted as Src1_h8). In the EX1 stage, a demultiplexer 539 of the computation unit 270 connects the 17-bit multiplier 511 of the computation unit 270 to the shifter-and-selector 431 of the computation unit 210 to output the result by the 17-bit multiplier 511 of the computation unit 270 to the shifter-and-selector 431.

The following describes a process operated in the FP mode when the computation unit 210 receives the instruction of the FP mode from the group controller 290: In the EX0 stage, for completing the mantissa calculation of Src0× Src1, the 17-bit multiplier 411 multiplies the 16 lowest bits of the mantissa of the FP value Src0 (denoted as Src0_l16) by the 16 lowest bits of the mantissa of the FP value Src1 (denoted as Src1_l16) and the 10-bit adder 413 adds an exponent of the FP value Src0 (denoted as Src0_exp) to an exponent of the FP value Src1 (denoted as Src1_exp). In the EX1 stage, in order to enable a merging of the mantissa calculation results by the computation units 210, 230, 250 and 270, the sifter-and-selector 431 right-shifts the computation result of the 17-bit multiplier 411 by 16 bits, outputs the right-shifted result to the 32-bit adder 432, outputs the computation result by the 17-bit multiplier 511 of the computation unit 230 to the 32-bit adder 432, outputs the computation result by the 17-bit multiplier 511 of the computation unit 250 to the 32-bit adder 432, left-shifts the computation result of the 17-bit multiplier 511 of the computation unit 270 by 16 bits and outputs the left-shifted result to the 32-bit adder 432. The 32-bit adder 432 calculates the sum of the four values to generate a calculation result of a mantissa of Src0×Src1. For completing a calculation of (Src0×Src1)+Src2, the 10-bit selector 437 compares an exponent of an FP value Src2 (denoted as Src2_exp) with the output result from the 10-bit adder 413 and outputs the greater as a final result of an exponent of (Src0×Src1)+Src2. In addition, the 10-bit selector 437 further controls the multiplexers 433 and 434 to transmit one of the output of the 32-bit adder 432 and a mantissa of the FP value Src2 (denoted as Src2_mant) to the 34-bit shifter 435, and transmit the other to the 34-bit adder 436. The 34-bit adder 436 adds an output of the 34-bit shifter 435 to an output of the multiplexer 434 to generate a final result of a mantissa of (Src0×Src1)+Src2.

To enable the computation unit 210 to output a result of the FP value, the ID unit 120 transmits a signal Out FP to the 34-bit shifter 451 to direct the 34-bit shifter 451 to maintain and process the original output (i.e. the mantissa) of the 34-bit adder 436 and transmits the signal Out FP to the 10-bit adder 453 to direct the 10-bit adder 453 to maintain and process the original output (i.e. the exponent) of the 10-bit selector 437. Subsequently, the comparator 455, the 34-bit shifter 451 and the 10-bit adder 453 form a loop for a normalization. In each iteration, when the MSB of the output of the 34-bit shifter 451 is not 1, the comparator 455 outputs an enabling signal EN to the 34-bit shifter 451 and the 10-bit adder 453, enabling the 34-bit shifter 451 to left-shift the result of 34 bits by one bit and the 10-bit adder 453 to add −1 to the result of 9 bits. The adjustment by the 34-bit shifter 451 and the 10-bit adder 453 continues until the comparator 455 detects that the MSB of the output of the 34-bit shifter 451 is 1. A merger 457 merges the sign bit of one bit, the mantissa of 23 bits (the final output of the 34-bit shifter 451) and the exponent of 8 bits (the final output of the 10-bit adder 453) and outputs a merged result (as shown in FIG. 3A).

Since the operations of the comparator 471 in the FP mode are similar with that in the PP mode, operation details of the comparator 471 in the FP mode may refer to that in the PP mode and are omitted for brevity.

In one aspect, in order to enable each of the ALGs 200*a* to 200*d* to perform calculations for four sets of PP data or one set of FP data in parallel, embodiments of the invention introduce an apparatus for calculating FP and PP values to contain a first-type computation lane (such as computation unit 210) and second-type computation lanes (such as computation units 230, 250 and 270) coupled to the first-type computation lane. Each of the first-type computation lane and the second-type computation lanes when operating in a first mode (such as PP mode) completes calculations for a set of the first-type data (such as PP data) independently. Each of the second-type computation lanes when operating in a second mode (such as FP mode) calculates a portion of a set of the second-type data (such as FP data) to generate a partial result. The first-type computation lane when operating in the second mode combines the partial results by the second-type computation lanes and outputs a combined result and uses the combined result to complete calculations for the set of the second-type data.

Since the result of an arithmetic calculation is usually compared with 0, in a further aspect, embodiments of the invention introduce an apparatus for integrating arithmetic with logic operations to contain calculation devices (such as the devices of the EX0 and EX1 stages as shown in FIG. 4 and FIG. 5) and a post-logic unit (such as the post-logic unit 470 or post-processing unit 570). The calculation devices calculate source data (such as PP/FP data Src0, Src1 and Src2) to generate first destination data and output the first destination data (including a sign bit, a mantissa and an exponent of a floating-point value). The post-processing unit coupled to the calculation devices compares the first destination data with 0 and outputs a comparison result.

In order to enable each of the four ALGs 200a to 200d to output calculation results for PP and FP data, in a further aspect, embodiments of the invention introduce an apparatus for integrating arithmetic with logic operations to contain the calculation devices and a normalization unit. The calculation devices calculate source data (such as PP/FP data Src0, Src1 and Src2) to generate first destination data and output the first destination data (including a sign bit, a mantissa and an exponent of a floating-point value). The normalization unit coupled to the calculation devices normalizes the first destination data to generate second destination data of a first type (such as PP data) when receiving a signal Out_PP indicating an output of first-type data. The normalization unit coupled to the calculation devices normalizes the first destination data to generate second destination data of a second type (such as FP data) when receiving a signal Out FP indicating an output of second-type data.

Although the embodiments have been described in FIGS. 2, 4 and 5 as having specific elements, it should be noted that additional elements may be included to achieve better performance without departing from the spirit of the invention. While the process flow described in FIG. 2 includes a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for integrating arithmetic with logic operations, comprising:
a calculation device, calculating source data to generate and output first destination data; and
a post-logic unit, coupled to the calculation device, performing a comparison operation for comparing the first destination data with 0, and outputting a comparison result;
wherein the post-logic unit is coupled to the calculation device via a delay circuit,
wherein the calculation device generates and outputs the first destination data at one cycle,
wherein the post-logic unit performs the comparison operation for comparing the first destination data with 0 and outputs the comparison result at the next cycle.

2. The apparatus of claim 1, wherein the first destination data is a floating-point value and not undergone a normalization.

3. The apparatus of claim 1, comprising:
a normalization unit, coupled to the calculation device via the delay circuit, normalizing the first destination data to generate second destination data,
wherein the normalization unit normalizes the first destination data to generate the second destination data at the next cycle.

4. The apparatus of claim 1, wherein the comparison operation comprises one of the following determinations:
whether the first destination data is greater than 0;
whether the first destination data equals 0;
whether the first destination data equals or is greater than 0;
whether the first destination data is less than 0;
whether the first destination data does not equal 0; and
whether the first destination data is less than or equals 0.

5. The apparatus of claim 4, wherein the post-logic unit comprises a comparator obtaining a signal from an ID (Instruction Decode) unit and performing one of the determinations according to the comparison Opcode.

6. The apparatus of claim 1, wherein the calculation device performs a calculation:

$$dest=Src0 \times Src1+Src2,$$

Src0, Src1 and Src2 represent the source data of three source memories, and dest represents the first destination data.

7. The apparatus of claim 6, comprising:
a normalization unit, coupled to the calculation device, normalizing the first destination data to generate the second destination data of a first type when receiving the signal indicating an output of first-type data, and normalizing the first destination data to generate the second destination data of a second type when receiving the signal indicating an output of second-type data.

8. The apparatus of claim 7, wherein the second destination data of the first type is 24-bit floating-point value, and the second destination data of the second type is 32-bit floating-point value.

9. The apparatus of claim 7, wherein the normalization unit comprises:
a shifter;
an adder;
a comparator, coupled to the shifter and the adder, wherein the comparator, the shifter and the adder form a loop for performing a normalization of a floating-point value; and
a merger, coupled to the shifter and the adder, combining a sign bit, a mantissa output from the shifter and an exponent output from the adder to generate the second destination data.

10. The apparatus of claim 9, wherein the shifter drops 7 bits from a mantissa of 34 bits of the first destination data and the adder drops 1 bit from an exponent of 10 bits of the first destination data when receiving the signal indicating an output of first-type data.

11. The apparatus of claim 10, wherein the comparator repeatedly operates until the MSB (Most Significant Bit) of a output from the shifter is 1,
  wherein, in each iteration, when the MSB of the output of the shifter is not 1, the comparator directs the shifter to left-shift the mantissa of the first destination data by one bit and directs the adder to add −1 to the exponent of the first destination data.

* * * * *